Patented Sept. 7, 1948

2,448,566

UNITED STATES PATENT OFFICE 2,448,566

PROCESS OF OBTAINING DIPENTAERYTHRITOL FROM MIXTURES CONTAINING THE SAME

Joseph A. Wyler, Allentown, Pa., assignor to Trojan Powder Company, Allentown, Pa., a corporation of New York No Drawing. Application March 11, 1944,
Serial No. 526,128

14 Claims. (Cl. 260—615)

The present invention relates to the purification of pentaerythritols, and more particularly, it relates to a process by which dipentaerythritol may be separated in a relatively pure form from a mixture forming an aqueous equilibrium in solution interfering with the crystallization of substantially pure dipentaerythritol therein and containing a weight ratio of pentaerythritol to dipentaerythritol not exceeding 92 to 8. The application is a continuation-in-part of my copending application Serial Number 478,962, filed March 12, 1943, now abandoned.

Commercial pentaerythritol is essentially a mixture, in varying proportions, of pentaerythritol $C(CH_2OH)_4$ and of dipentaerythritol

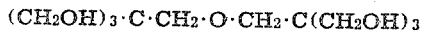

$(CH_2OH)_3 \cdot C \cdot CH_2 \cdot O \cdot CH_2 \cdot C(CH_2OH)_3$

As is well known, the crystallization of pentaerythritol from solutions of pentaerythritol and dipentaerythritol is not a simple operation. Thus, it is very difficult to obtain pentaerythritol of such a high degree of purity that it will have a melting point greater than 250° C., and it is still more difficult to obtain dipentaerythritol, which is always present in commercial pentaerythritol, of such a degree of purity that it will melt at about 218° C.–221° C.

Various complicated methods have been suggested for the separation of pentaerythritol from dipentaerythritol. One of these is based upon converting the mixture of pentaerythritols to nitrates, separating the nitrates by means of acetone, and reducing each nitrate to the original alcohol; another method involves the conversion of the pentaerythritols to the corresponding formates and heating of this mixture to decompose one formate, but not the other; and another method requires the removal, by vacuum distillation, of the pentaerythritol from the dipentaerythritol. All published data upon the preparation and purification of pentaerythritol emphasize the difficulties involved therein.

I have found that most of these difficulties are caused by molecular complexes formed between pentaerythritol and dipentaerythritol and the establishment of an equilibrium in aqueous solution. In my Patent No. 2,288,929, issued July 7, 1942, there is disclosed and claimed a process for producing and purifying pentaerythritol, which comprises heating a mixture of the pentaerythritols in an aqueous medium at a temperature above 108° C., evaporating a sufficient amount of water from the mixture above about 108° C. to effect the separation of pentaerythritol crystals and filtering off the said crystals of pentaerythritol at a temperature approximating 108° C. If dipentaerythritol is desired, the filtrate must be cooled to a temperature from about 65° C. to about 70° C., and the crystals thus produced separated from the solution. If the filtrate is further cooled, dipentaerythritol crystals will form in the solution, and these may then be separated from the mother liquor.

The process of the present invention differs in important respects from that disclosed in Patent No. 2,288,929. Thus, in the patent, as pointed out above, pentaerythritol is first separated from the mixture by heating the aqueous solution at a temperature of about 108° C. to concentrate the solution, and the crystals formed at about 108° C. are separated from the solution. In addition, intermediate cooling and crystallization steps are necessary before dipentaerythritol crystals may be obtained. The present invention, as will hereinafter appear, provides a process by which dipentaerythritol crystals in a relatively pure form are obtained as the initial product from a mixture which in solution exists in an aqueous equilibrium interfering with the crystallization of dipentaerythritol therein. In accordance with the invention, the dipentaerythritol is obtained at a relatively low temperature, so that the superheating and intermediate cooling and crystallization steps of my prior patent, with their attendant disadvantages, are not required.

The principal object of the present invention, therefore, is to provide a simple and economical process by which dipentaerythritol may be obtained in relatively pure form directly by crystallization of an aqueous solution of a mixture of pentaerythritol and dipentaerythritol which normally exists in an aqueous equilibrium interfering with crystallization of the dipentaerythritol and which contains not more than about 9 parts of the former to about 1 part of the latter.

Other objects will be apparent from a consideration of the specification and claims.

As previously indicated, a solution of pentaerythritol and dipentaerythritol in water does not act in a manner that would be expected of a simple or ordinary solution of two solutes which are non-reactive toward each other. The chemical constitution of pentaerythritol and dipentaerythritol would lead one reasonably to the conclusion that they are mutually chemically non-reactive, but it has been found that there is, in aqueous medium, a chemical attraction between these two substances which causes the formation of what may be termed "molecular complexes" and the establishment of an aqueous equilibrium in the solution, and that these factors prevent the use of the usual crystallization procedures. For these reasons, if the generally available mixtures of pentaerythritol and dipentaerythritol in water are heated to a temperature above about 65°–70° C. and the mixture then cooled to room temperature, the dipentaerythritol does not separate, as would be expected of simple solutions of pentaerythritol and dipentaerythritol. The solubility of both the pentaerythritol and the dipentaerythritol is altered due to the formation of at least one molecular complex between the pentaerythritol and the dipentaerythritol, and this in turn alters the relative solubility of both components in the water and produces mixtures from which it is very difficult to separate pure dipentaerythritol or pure pentaerythritol. Thus, of the various possible mixtures of pentaerythritol and dipentaerythritol, the ones most often encountered are the ones most difficult to separate into substantially pure pentaerythritol and substantially pure dipentaerythritol. Examples of such mixtures are: about 70 parts of pentaerythritol to 30 parts of dipentaerythritol (melting point about 184° C.–190° C.), and 76 parts of pentaerythritol to 24 parts of dipentaerythritol (melting point about 190° C.–196° C.). It makes no difference whether the pentaerythritol and dipentaerythritol in this particular mixture exists in the form of a molecular complex, such as the double compound

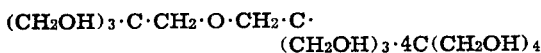

or as a simple mixture of pentaerythritol and dipentaerythritol, for the reason that, when a mixture of pentaerythritol and dipentaerythritol is dissolved in water, an equilibrium is established depending upon the temperature, the proportion of dipentaerythritol to pentaerythritol and concentration of the solution, and the resulting molecular complex may then become the dominant solute.

The present invention provides a process by which it is possible to separate the dipentaerythritol in relatively pure condition from the pentaerythritol contained in a mixture of the type described by crystallization from water under conditions which insure the splitting up of the molecular complexes or aggregates present and the disturbing of the aqueous equilibrium of the solution. In order to accomplish the desired crystallization, dipentaerythritol is supplied to an aqueous solution of the mixture in an amount to disturb the aqueous equilibrium. In addition, the solution is cooled from a temperature above that at which an interfering molecular complex is not encountered to a temperature therebelow to crystallize dipentaerythritol from the solution, and the amount of water in the solution is controlled to provide a solution of a crystallization point not greater than said temperature at which the interfering molecular complex is not encountered and in which substantially all of the pentaerythritol, but not all of the dipentaerythritol, will remain in solution at the crystallization temperature. The control of these factors makes it possible to effect an excellent separation of relatively pure dipentaerythritol from the pentaerythritol with which it is associated in the mixture.

Reference has been made above to the fact that the mixtures of dipentaerythritol and pentaerythritol treated in accordance with the process of the invention contain not more than about 92 parts by weight of pentaerythritol to 8 parts by weight of dipentaerythritol, or conversely, the mixtures contain a ratio of dipentaerythritol to pentaerythritol greater than about 8 to 92. The mixtures treated must contain dipentaerythritol in the amount stated for otherwise the solubility factors of the two components prevent the crystallization of dipentaerythritol. Furthermore, when mixtures containing more than about 8% dipentaerythritol are treated by the process hereindescribed, the amount of dipentaerythritol crystallized in the solution will be limited by this same condition, so that the maximum crystallization of dipentaerythritol that can be obtained from any particular mixture will correspond to the amount of dipentaerythritol in the mixtures in excess of a ratio of about 8 parts of dipentaerythritol to about 92 parts of pentaerythritol; in other words, the dipentaerythritol remaining in the filtrate will be in a ratio of about 8 parts of dipentaerythritol to about 92 parts of pentaerythritol. Hereinafter, therefore, the phrase "maximum crystallization of dipentaerythritol" refers to the reduction of the ratio of dipentaerythritol to pentaerythritol in the solution to about 8 to about 92.

As previously stated, the present invention provides a process by which dipentaerythritol may be crystallized from a solution in which an aqueous equilibrium is established which interferes with the crystallization of substantially pure dipentaerythritol. The aqueous equilibrium is established when certain mixtures of dipentaerythritol and pentaerythritol are dissolved in water and the aqueous equilibrium may prevent the crystallization of substantially pure dipentaerythritol from the solution or it may merely interfere with the maximum crystallization of dipentaerythritol, and the process is applicable for the treatment of both types of mixtures. The question of whether or not a mixture of dipentaerythritol and pentaerythritol will form an aqueous equilibrium in solution depends upon the ratio of dipentaerythritol to pentaerythritol in the mixture, the concentration of these pentaerythritols in the solution, the purity of the mixture and the temperature of the solution.

With mixtures containing between about 8 parts to about 20 parts of dipentaerythritol and about 92 parts to about 80 parts of pentaerythritol, the aqueous equilibrium is encountered in all cases and substantially pure dipentaerythritol can not be crystallized from the solution unless the process hereindescribed is employed. With certain mixtures containing between about 20 parts to about 33 parts of dipentaerythritol and about 80 parts to about 67 parts of pentaerythritol, some dipentaerythritol can be made to crystallize from the solution without disturbing the aqueous equilibrium, but in such cases the aqueous equilibrium will prevent maximum crystallization and the amount crystallized will correspond to the amount of dipentaerythritol in the mixture in excess of a ratio in the neighborhood of about 20 parts of dipentaerythritol to about 80 parts of pentaerythritol, that is to say, in this case, the dipentaerythritol remaining in the filtrate will be in a ratio in the neighborhood of about 20 parts of dipentaerythritol to about 80 parts of pentaerythritol. The amount which will separate may vary depending on the amount and nature of the impurities usually encountered in commercial mixtures of pentaerythritol and dipentaerythritol, and the purer the mixture with respect to the pentaerythritols, the lower will be the ratio where some dipentaerythritol will crystallize.

I have found that with solutions containing a ratio of dipentaerythritol to pentaerythritol substantially greater than 30 to 70, for example in excess of 33 parts of dipentaerythritol to 67 parts of pentaerythritol, the aqueous equilibrium interfering with the crystallization of the dipentaerythritol is usually not established, and difficulties are not encountered in the separation of dipentaerythritol from the mixture by crystallization. The precise ratio of dipentaerythritol to pentaerythritol above which the aqueous equilibrium in solution does not exist depends upon certain factors, such as the purity of the mixture with respect to the dipentaerythritol and pentaerythritol in the mixture, and in some cases may approach a ratio of 30 parts of dipentaerythritol to about 70 parts of pentaerythritol. On the other hand, at times, difficulties may be encountered when the mixture contains about, or even somewhat more than, 33 parts of dipentaerythritol to about 67 parts of pentaerythritol. It has been found, however, that with mixtures having a ratio of dipentaerythritol to pentaerythritol of about 35 to 65, the difficulties due the formation of an aqueous equilibrium are not present.

Irrespective of the particular ratio of dipentaerythritol to pentaerythritol in the mixture, the process of the invention may be successfully employed in the treatment of all mixtures which in solution form an aqueous equilibrium interfering with crystallization of substantially pure dipentaerythritol therein, and such mixtures are included herein and in the claims in the phrase "a mixture of dipentaerythritol and pentaerythritol forming an aqueous equilibrium in solution interfering with the crystallization of substantially pure dipentaerythritol therein and containing a ratio of dipentaerythritol to pentaerythritol greater than about 8 parts of dipentaerythritol by weight to about 92 parts of pentaerythritol." Furthermore, in view of the fact that with mixtures of dipentaerythritol and pentaerythritol, the aqueous equilibrium is not encountered above a certain ratio of dipentaerythritol which may vary between about 30 parts to 35 parts of dipentaerythritol and 70 parts to 65 parts of pentaerythritol, the phrase "a ratio of dipentaerythritol to pentaerythritol substantially greater than 30 to 70" is used herein to designate this ratio.

In accordance with the present invention, the aqueous equilibrium referred to is disturbed or broken by supplying additional dipentaerythritol to the solution. The amount supplied in any particular case will be sufficient to disturb the aqueous equilibrium and will depend on the ratio of the dipentaerythritol to pentaerythritol in the solution, the concentration of the solution and the nature and the amount of impurities usually encountered in commercial mixtures of pentaerythritol and dipentaerythritol.

Preferably, the amount of dipentaerythritol supplied will be sufficient to raise the ratio of dipentaerythritol to pentaerythritol in the solution to a ratio above which the aqueous equilibrium in a solution of the same purity and concentration would not be encountered, namely to a ratio substantially above 30 parts of dipentaerythritol to 70 parts of pentaerythritol as hereinabove defined. In this case, maximum crystallization can be obtained when the process of the invention is followed; that is, the aqueous equilibrium will be sufficiently disturbed so that dipentaerythritol can be crystallized in an amount corresponding to the amount in the mixture in excess of that corresponding to a ratio of about 8 parts of dipentaerythritol to about 92 parts of pentaerythritol. In addition, the dipentaerythritol supplied to the solution to disturb the equilibrium is crystallized and may be recovered. Advantageously, a slight excess of dipentaerythritol is supplied, but the excess need only be small, for example 2% to 5%. In most cases, it will be desirable in order to insure satisfactory crystallization to supply sufficient dipentaerythritol so that the ratio of dipentaerythritol to pentaerythritol in the solution treated in accordance with the process will contain at least 35 parts of the former to 65 parts of the latter. It has been found, for instance, that if the solution contains at least 40 parts of dipentaerythritol to 60 parts of pentaerythritol, the maximum crystallization of dipentaerythritol will be prompt and complete. Since the dipentaerythritol supplied is recovered with the dipentaerythritol contained in the mixture, larger amounts may be employed if desired, but no advantage is gained thereby. It is to be understood that this procedure is applicable for the treatment of any mixture of dipentaerythritol and pentaerythritol containing a ratio of dipentaerythritol to pentaerythritol greater than about 8 to 92 and which form an aqueous equilibrium interfering with the crystallization of dipentaerythritol, for example mixtures containing from the stated minimum to a ratio up to a mixture containing about 33 parts of dipentaerythritol to 67 parts of pentaerythritol. Even if the mixture will provide substantially pure crystalline dipentaerythritol in solution, the process will disturb the equilibrium so that maximum crystallization can be obtained.

In an alternative, but not preferred, procedure applicable for the treatment of mixtures of dipentaerythritol and pentaerythritol containing a ratio of dipentaerythritol to pentaerythritol greater than about 20 to 80, the dipentaerythritol may be supplied to the solution in an amount insufficient to raise the ratio of dipentaerythritol to pentaerythritol to a ratio substantially greater than 30 to 70. In such a procedure, the aqueous equilibrium will be disturbed by the dipentaerythritol supplied and dipentaerythritol will crystallize in the solution, but a new aqueous equilibrium will be established when the ratio of dipentaerythritol to pentaerythritol in the solution has been reduced to the neighborhood of about 20 parts of dipentaerythritol to about 80 parts of pentaerythritol and further crystallization of dipentaerythritol is prevented. Hence, since the ratio of dipentaerythritol to pentaerythritol has not been raised to a ratio substantially greater than 30 to 70, maximum crystallization will not bo obtained. In following the procedure described in this paragraph, the amount of dipentaerythritol that can be recovered from the original mixture will correspond to the amount of dipentaerythritol in the mixture in excess of an amount in the neighborhood of about 20 parts of dipentaerythritol to about 80 parts of pentaerythritol, together with the amount of dipentaerythritol supplied. In proceeding as hereindescribed, the amount of dipentaerythritol supplied may be small, for example 2% or 3%, although larger amounts may be supplied if desired. The amount of dipentaerythritol separated will depend upon the nature and amount of impurities usually encountered in commercial mixtures of pentaerythritol and dipentaerythritol and in some cases the amount separated will be greater or less than the amount in the mixture in excess of 20 parts of dipentaerythritol to 80 parts of pentaerythritol.

The dipentaerythritol which is supplied to the solution to destroy the aqueous equilibrium may be added to the mixture of dipentaerythritol and pentaerythritol prior to dissolving the mixture in water or it may be added to the solution of the mixture, and both procedures are included herein and in the claims in the phrase "supplying dipentaerythritol to a solution of the mixture." The process is also applicable to the treatment of liquors containing mixtures of dipentaerythritol and pentaerythritol and, the above phrase also includes the treatment of these liquors. Advantageously, relatively pure dipentaerythritol is employed, for example, dipentaerythritol with a melting point of from 218° C. to 220° C., although satisfactory results are obtained by using a less pure product. While dipentaerythritol obtained from any source is applicable for use, dipentaerythritol obtained from the reduction of dipentaerythritol hexanitrate is especially advantageous due to the uniformity of its action in the process.

Instead of calculating the amount of dipentaerythritol to be added, the operator of the process may add the dipentaerythritol which he knows from experience is sufficient to destroy the aqueous equilibrium to cause separation of dipentaerythritol from the mixture; or he may carry out a simple test to ascertain whether dipentaerythritol should be added. The test which has been devised for this purpose is to place a small sample, of known weight, of the hot, clear solution in a hot test tube, and stir while cooling. If the crystals which separate are sandy, clear, and dense, dipentaerythritol must be added—on the other hand, if the crystals which separate are plate-like, dull, and fluffy, sufficient dipentaerythritol is present. If the test shows that dipentaerythritol must be added, a known weight of dipentaerythritol is added to an additional sample, and the test repeated. This may be continued until the test sample shows that enough dipentaerythritol has been added to give the desired described crystal structure. The amount of dipentaerythritol found to be necessary is then added to the main solution. In practice, more dipentaerythritol is preferably added than the test indicates is necessary in order to insure the presence of a sufficient amount and to expedite operations.

Referring to the temperature, it has been found that, in an aqueous solution of pentaerythritol and dipentaerythritol, there is a temperature below which a molecular complex exists which will interfere with the crystallization of the dipentaerythritol from the solution. In accordance with the invention, a solution, in which the other factors are adjusted as herein discussed, is cooled from a temperature above which an interfering molecular complex is not encountered to a temperature therebelow to effect crystallization of the dipentaerythritol from the solution. The temperature above which the interfering molecular complex will not be encountered is within the range of about 65° C. to about 70° C. and is generally about 68° C., the precise temperature within the range being dependent upon the concentration of the solution, the proportion of pentaerythritol to dipentaerythritol in the solution, and the purity of the solution with respect to pentaerythritol and dipentaerythritol. This temperature in the case of any particular mixture above which the interfering molecular complex is not encountered and below which it exists is designated herein as "about 68° C."

The mixture of pentaerythritol and dipentaerythritol to be treated in accordance with the invention either before or after the addition of dipentaerythritol may be dissolved in water at a moderate temperature and then heated above about 68° C., prior to cooling the solution to the temperature at which the crystallization is to be effected, namely, below about 68° C. The solution may be heated at any temperature above about 68° C., for example, to its boiling point. If desired, the solution may be heated to a temperature higher than its normal boiling point by the application of pressure thereto, or the solution may be heated under vacuum to a temperature above about 68° C. Obviously, instead of dissolving the mixture in water at a moderate temperature and subsequently heating the solution, the mixture may be dissolved in water heated to a sufficient temperature so that the temperature of the resulting mixture will be above about 68° C.

While the crystallization temperature may be any temperature below about 68° C., usually the temperature at which the crystallization is completed will be below 50° C. and more specifically below 40° C. Very satisfactory results are obtained if the crystallization of the dipentaerythritol is completed at room temperature, for example, in the neighborhood of 20° C.

The crystals of dipentaerythritol are usually removed from the aqueous medium at the temperature at which crystallization is completed; but they may be separated from the aqueous medium at any other temperature below about 68° C. However, in order that there may not be a redissolution of the crystals, the crystals are generally separated from the aqueous medium at a temperature not higher than the temperature at which the crystallization is completed, although at times, in order to obtain a purer product, it may be desirable to raise the temperature somewhat above that at which the crystallization is completed before separating the crystals from the mother liquor.

With reference to the concentration of the pentaerythritol and dipentaerythritol in the solution, the concentration is adjusted so that no crystallization will take place at temperatures greater than about 68° C., that is a temperature below which the molecular complex referred to exists, and so that at the temperature of crystallization substantially all of the pentaerythritol will remain in the solution, but dipentaerythritol will crystallize. In other words, the process is operative only with solutions from which, upon cooling, crystals begin to separate below said temperature of about 68° C., and with solutions which, at the temperature of crystallization, are undersaturated with respect to the pentaerythritol, but are sufficiently concentrated to effect crystallization of dipentaerythritol. Advantageously, the concentration is adjusted so that relatively high yields of dipentaerythritol will be obtained, for example, so that in the preferred procedure substantially all of the dipentaerythritol in excess of a ratio of about 8 parts of dipentaerythritol to about 92 parts of pentaerythritol will crystallize at the crystallization temperature. In general, it is preferred to use solutions of pentaerythritol and dipentaerythritol of from about 16% to 20% strength at the time at which the dipentaerythritol begins to separate, but any strength of solution can be employed from which the dipentaerythritol just begins to separate at a temperature below about 68° C., i. e., the solution has a crystallization point not greater than about 68° C. This is a critical upper limit using the mixtures of pentaerythritol and dipentaerythritol hereindescribed, above which dipentaerythritol cannot be separated from pentaerythritol, but below which an excellent separation of dipentaerythritol from pentaerythritol is obtained.

The size and physical nature of the dipentaerythritol crystals obtained depend upon the rate of cooling to the temperature of the crystallization and whether or not the solution is stirred during the crystallization step. Preferably, the crystallization step is carried out with slow cooling and slow stirring in order to obtain plate-like crystals which are readily filtrable and susceptible to easy washing to remove adhering impurities. The crystallization, if desired, may be conducted under a vacuum or under super-atmospheric pressure. Upon the completion of the crystallization the crystals are separated from the mother liquor by filtration or any other conventional means and may be dried at room or an elevated temperature. It will be found that the dipentaerythritol crystals obtained have a melting point of about 215° C.–220° C., which shows that they are substantially pure.

The filtrate obtained after the separation of the dipentaerythritol crystals may be further processed. For example, the filtrate may be concentrated to a small volume by hot evaporation. This hot evaporation is usually carried out by boiling the filtrate just mentioned at a temperature below about 108° C. until an appreciable quantity of crystals have separated at this boiling temperature, then cooling the mixture, with stirring, to a temperature not below about 70° C. and filtering at this temperature to remove the crystals of high melting point pentaerythritol which have formed. If the evaporation has been properly carried out, the filtrate will contain pentaerythritol and dipentaerythritol in approximately the proportions of 70 to 30 and will be available for use in the process herein described for the preparation of dipentaerythritol. Thus, the invention not only provides a method of obtaining high quality dipentaerythritol from mixtures of dipentaerythritol and pentaerythritol, but also furnishes a method of obtaining high quality pentaerythritol from such mixtures.

The following examples, in which all parts are by weight, are typical of the process of the invention, and illustrate the treatment of a mixture of pentaerythritol and dipentaerythritol wherein there is an addition of further amounts of dipentaerythritol in order to disturb the aqueous equilibrium.

*Example No. 1*

14.29 parts of a 70 to 30 commercial mixture of pentaerythritol and dipentaerythritol (M. P. 185° C.–188.5° C.) and 5.71 parts of substantially pure dipentaerythritol were dissolved in 100 to 110 parts of boiling water to form a clear solution. The latter was then cooled with stirring. At 58° C., crystals began to separate and when the mixture reached 20° C. it was filtered and the crystals on the filter washed with water and dried. 9.06 parts of dipentaerythritol of M. P. 218° C.–220° C. were obtained. The original mixture contained 4.28 parts of dipentaerythritol, indicating a yield of dipentaerythritol actually removed from the mixture of about 78% of theory. In carrying out this experiment without the use of the additional amount of dipentaerythritol, no separation of dipentaerythritol takes place upon cooling to 20° C., even after hours of standing. The effect of the added dipentaerythritol is to disturb the equilibrium of the solution and thus to precipitate out the indicated amount of dipentaerythritol.

*Example No. 2*

21.43 parts of the same material as was used in Example No. 1 and 3.57 parts of substantially pure dipentaerythritol were dissolved in 100 to 110 parts of boiling water to form a clear solution and the latter was handled in the same manner as described under Example No. 1. The total yield of dipentaerythritol obtained was 8.82 parts of material melting at 217° C.–219° C. Since 3.57 parts of dipentaerythritol had been added as such to disturb the equilibrium, 5.25 parts of dipentaerythritol came from the original mixture or a yield of dipentaerythritol of over 80% of theory was obtained.

Considerable modification is possible in the adjustment of the temperature, the concentration and proportion factors, within the ranges given, without departing from the essential features of the invention.

I claim:

1. The process of separating dipentaerythritol from a mixture of pentaerythritol and dipentaerythritol which form an aqueous equilibrium in solution interfering with the crystallization of dipentaerythritol in substantially pure form therefrom and containing a ratio of dipentaerythritol to pentaerythritol greater than about 8 parts of dipentaerythritol by weight to about 92 parts of pentaerythritol which comprises supplying dipentaerythritol to a solution of said mixture in an amount of raise the ratio of dipentaerythritol to pentaerythritol to a ratio substantially above 30 to 70 to disturb said interfering aqueous equilibrium and furnishing heat to provide a resulting aqueous solution of a temperature above about 68° C. where an interfering molecular complex between pentaerythritol and dipentaerythritol is not encountered; next cooling said aqueous solution to a temperature therebelow to crystallize dipentaerythritol from the solution, the amount of water present being controlled to provide a solution of a crystallization point not greater than said temperature of about 68° C. from which dipentaerythritol substantially in excess of that supplied to the solution will crystallize but in which substantially all of the pentaerythritol of said mixture will remain in solution at the temperature at which the crystals of dipentaerythritol are separated from the aqueous medium; and separating the crystals of dipentaerythritol from the aqueous medium at a temperature below said temperature of about 68° C.

2. The process of claim 1 wherein the dipentaerythritol supplied raises the ratio of the dipentaerythritol to the pentaerythritol in the solution to at least about 35 to about 65; and wherein the solution is cooled to a temperature below about 50° C.

3. The process of claim 1 wherein the mixture of dipentaerythritol and pentaerythritol contains between about 8 and 20 parts of dipentaerythritol to about 92 to 80 parts of pentaerythritol.

4. The process of claim 1 wherein the dipentaerythritol supplied raises the ratio of the dipentaerythritol to the pentaerythritol in the solution to at least about 35 to about 65; and wherein the solution is cooled to a temperature of about 20° C.

5. The process of claim 1 wherein the dipentaerythritol supplied raises the ratio of the dipentaerythritol to the pentaerythritol in the solution to at least about 35 to about 65; wherein the solution is cooled to a temperature of about 20° C.; and wherein the crystals of dipentaerythritol are separated from the aqueous medium at a temperature of about 20° C.

6. The process of claim 1 wherein the dipentaerythritol supplied raises the ratio of the dipentaerythritol to the pentaerythritol in the solution to a ratio greater than about 40 to about 60; wherein the solution is cooled to a temperature of about 20° C.; and wherein the crystals of dipentaerythritol are separated from the aqueous medium at a temperature of about 20°C.

7. The process of separating dipentaerythritol from a mixture of dipentaerythritol and pentaerythritol which form an aqueous equilibrium in solution interfering with the crystallization of dipentaerythritol in substantially pure form therefrom and containing a ratio of dipentaerythritol to pentaerythritol greater than about 8 parts of dipentaerythritol by weight to about 92 parts of pentaerythritol but not substantially greater than 30 parts of dipentaerythritol to 70 parts of pentaerythritol, which comprises supplying dipentaerythritol to a solution of said mixture in amount to raise the ratio of dipentaerythritol to pentaerythritol to a ratio substantially above 30 to 70 to disturb said interfering aqueous equilibrium and furnishing heat to provide a resulting aqueous solution of a temperature above about 68° C., where an interfering molecular complex between pentaerythritol and dipentaerythritol is not encountered; next cooling said aqueous solution to a temperature therebelow to crystallize dipentaerythritol from the solution, the amount of water present being controlled to provide a solution of a crystallization point not greater than said temperature of about 68° C. and in which substantially all of the pentaerythritol of said mixture will remain in solution at the temperature at which the crystals of dipentaerythritol are separated from the aqueous medium but in which substantially all of the dipentaerythritol in excess of a ratio of about 8 parts of dipentaerythritol to about 92 parts of pentaerythritol will crystallize at the crystallization temperature; and separating the crystals of dipentaerythritol from the aqueous medium at a temperature below said temperature of about 68° C.

8. The process of claim 7 wherein the dipentaerythritol supplied raises the ratio of the dipentaerythritol to the pentaerythritol in the solution to at least about 35 to about 65; and wherein the solution is cooled to a temperature below about 50° C.

9. The process of claim 7 wherein the mixture of dipentaerythritol and pentaerythritol contains between about 8 and 20 parts of dipentaerythritol to about 92 to 80 parts of pentaerythritol.

10. The process of claim 7 wherein the dipentaerythritol supplied raises the ratio of the dipentaerythritol to the pentaerythritol in the solution to at least about 35 to about 65; and wherein the solution is cooled to a temperature of about 20° C.

11. The process of claim 7 wherein the dipentaerythritol supplied raises the ratio of the dipentaerythritol to the pentaerythritol in the solution to at least about 35 to about 65; wherein the solution is cooled to a temperature of about 20° C.; and wherein the crystals of dipentaerythritol are separated from the aqueous medium at a temperature of about 20° C.

12. The process of claim 7 wherein the dipentaerythritol supplied raises the ratio of the dipentaerythritol to the pentaerythritol in the solution to a ratio greater than about 40 to about 60; wherein the solution is cooled to a temperature of about 20° C.; and wherein the crystals of dipentaerythritol are separated from the aqueous medium at a temperature of about 20° C.

13. The process of separating dipentaerythritol a mixture of dipentaerythritol and pentaerythritol which forms an aqueous equilibrium in solution interfering with the crystallization of dipentaerythritol in substantially pure form therefrom and containing a ratio of dipentaerythritol to pentaerythritol greater than about 8 parts of dipentaerythritol by weight to about 92 parts of pentaerythritol but not substantially greater than 30 parts of dipentaerythritol to 70 parts of pentaerythritol, which comprises supplying dipentaerythritol to a solution of said mixture in an amount to raise the ratio of dipentaerythritol to pentaerythritol to a ratio substantially above 30 to 70 to disturb said interfering aqueous equilibrium and furnishing heat to provide a resulting aqueous solution of a temperature above about 68° C., where an interfering molecular complex between pentaerythritol and dipentaerythritol is not encountered; next cooling said aqueous solution to a temperature therebelow to crystallize dipentaerythritol from the solution, the amount of water present being controlled to provide a solution of a crystallization point not greater than said temperature of about 68° C. and in which substantially all of the pentaerythritol of said mixture will remain in solution at the temperature at which the crystals of dipentaerythritol are separated from the aqueous medium but in which substantially all of the dipentaerythritol in excess of a ratio of about 8 parts of dipentaerythritol to about 92 parts of pentaerythritol will crystallize at the crystallization temperature, separating the crystals of dipentaerythritol from the aqueous medium at a temperature below said temperature of about 68° C., evaporating the filtrate by boiling it at a temperature below about 108° C. until an appreciable quantity of pentaerythritol crystals have separated at said boiling temperature; cooling to a temperature not below about 70° C.; and separating the pentaerythritol crystals from the aqueous medium.

14. The process of claim 13 wherein the dipentaerythritol supplied raises the ratio of the dipentaerythritol to the pentaerythritol in the solution to at least about 35 to about 65; wherein the solution is cooled to a temperature of about 20° C.; and wherein the crystals of dipentaerythritol are separated from the aqueous medium at a temperature of about 20° C.

JOSEPH A. WYLER.

REFERENCES CITED

The following references are of record in the file of this patent:

UNITED STATES PATENTS

| Number | Name | Date |
|---|---|---|
| 2,004,010 | Naujoks | June 4, 1935 |
| 2,011,589 | Paterson | Aug. 20, 1935 |
| 2,288,929 | Wyler | July 7, 1942 |
| 2,325,589 | Bried | Aug. 3, 1943 |

FOREIGN PATENTS

| Number | Country | Date |
|---|---|---|
| 298,932 | Germany | Dec. 12, 1919 |

OTHER REFERENCES

Gilman: "Organic Syntheses," Annual vol. IV, pages 53–6.